US007849473B2

(12) United States Patent
Fukasawa et al.

(10) Patent No.: US 7,849,473 B2
(45) Date of Patent: Dec. 7, 2010

(54) OPTICAL DISK APPARATUS WITH SHARED DRIVING SOURCE MECHANISM

(75) Inventors: Akihiro Fukasawa, Kyoto (JP); Kazuo Mori, Kyoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 818 days.

(21) Appl. No.: 11/792,765

(22) PCT Filed: Dec. 27, 2005

(86) PCT No.: PCT/JP2005/023896

§ 371 (c)(1),
(2), (4) Date: Jun. 8, 2007

(87) PCT Pub. No.: WO2006/073089

PCT Pub. Date: Jul. 13, 2006

(65) Prior Publication Data

US 2009/0125927 A1 May 14, 2009

(30) Foreign Application Priority Data

Jan. 7, 2005 (JP) ............................. 2005-002239

(51) Int. Cl.
G11B 7/00 (2006.01)
G11B 17/03 (2006.01)
G11B 17/04 (2006.01)
G11B 33/02 (2006.01)

(52) U.S. Cl. ..................................... 720/661; 720/605

(58) Field of Classification Search .................. 720/605, 720/608, 624, 625, 661
See application file for complete search history.

(56) References Cited

U.S. PATENT DOCUMENTS

| 2003/0007441 A1 | 1/2003 | Wada et al. |
| 2005/0050570 A1 | 3/2005 | Abe |
| 2006/0072384 A1* | 4/2006 | Fukasawa ................. 369/44.14 |

FOREIGN PATENT DOCUMENTS

| JP | 11-345449 A | 12/1999 |
| JP | 2002-93013 A | 3/2002 |
| JP | 2002-269936 A | 9/2002 |
| JP | 2002-288911 A | 10/2002 |
| JP | 2004-185771 A | 7/2004 |
| JP | 2001-351291 A | 3/2005 |
| JP | 2005-78681 A | 3/2005 |

* cited by examiner

Primary Examiner—Craig A. Renner
Assistant Examiner—Gustavo Polo
(74) Attorney, Agent, or Firm—Birch, Stewart, Kolasch & Birch, LLP.

(57) ABSTRACT

A traverse chassis supported in a swingable manner with respect to the main chassis and a disk transport plate provided along an opening are provided in the main chassis. The transport plate has a base part having a slender rectangular shape in plan view and a transport roller provided in the surface of the base part so as to extend in the longitudinal direction of the base part. The transport roller is provided such that its rotationally-moving shaft extends in parallel to an X direction, and an optical disk mounted on these components is loaded into or unloaded from an optical disk apparatus by rotation of the transport roller.

2 Claims, 11 Drawing Sheets

OPTICAL DISK APPARATUS WITH SHARED DRIVING SOURCE MECHANISM

TECHNICAL FIELD

The present invention relates to an optical disk apparatus for recording a signal on an optical disk serving as information recording medium, such as a compact disk (what is called a CD), a digital versatile disk (what is called a DVD) and the like, or reproducing a recorded signal.

BACKGROUND ART

There is a conventional optical disk apparatus provided with an opening in a front panel of the drive for allowing a disk tray to go in/out through the opening. In this optical disk apparatus, an optical disk is mounted on the disk tray come out through the opening, and thereafter, the optical disk is drawn into a predetermined position inside the drive together with the disk tray.

This type of optical disk apparatus is configured such that, after an optical disk is drawn into and held in the inside of the drive, a turn table rises from a predetermined lowered position to a predetermined raised position so that the optical disk is mounted on the turn table, and the optical disk is held sandwiched between the turn table and a member called a damper provided in a position opposed to the turn table.

And, in this condition, the optical disk is rotated at a predetermined number of revolutions by rotation of the turn table.

In the case of a reproducing operation, for example, a signal recorded on this optical disk is reproduced by a recording and reproduction device. That is, an optical pickup for reading a signal is reciprocated between the outer peripheral side and inner peripheral side of the optical disk in accordance with the tracking position of a signal recorded in a predetermined range of the optical disk, so that reproduction of a predetermined information signal is achieved.

As such optical disk apparatus, a drive as shown in Patent document 1, for example, is disclosed.

The optical disk apparatus disclosed in Patent document 1, as basic operations requiring a driving force given by a motor and the like, requires four operations in total: a disk transporting operation of reciprocating a disk tray between the inside and outside of the drive to transport an optical disk to the inside or outside of the device; a turn table raising/lowering operation of reciprocating a turn table between a predetermined lowered position and a predetermined raised position; a disk rotating operation of rotationally driving the turn table to rotate the optical disk; and a pickup moving operation of reciprocating an optical pickup between the outer peripheral side and inner peripheral side of the optical disk.

The optical disk apparatus of Patent document 1 is configured such that three operations in total of the disk transporting operation, turn table raising/lowering operation and pickup moving operation are carried out sequentially with a single motor, and all the operations including the disk rotating operation are carried out with two motors in total.

Patent document 1: Japanese Patent Application Laid-Open No. 2004-185771 (FIG. 5).

The above-described conventional optical disk apparatus is configured to mount an optical disk on the disk tray, and is not adapted to what is called a slot-in type of directly loading/unloading an optical disk.

DISCLOSURE OF INVENTION

The present invention has been made to solve the aforementioned problems, and has an object to provide an optical disk apparatus adapted to the slot-in type in an optical disk apparatus in which all operations including the disk rotating operation are carried out with two motors in total.

The optical disk apparatus according to the present invention is the optical disc drive into/from which an optical disk is freely loaded/unloaded for recording and/or reproducing an information signal on the optical disk, and includes a turn table supporting rotatably the optical disk as loaded, a rotation driving source mechanism rotationally driving the turn table, a turn table raising/lowering mechanism raising/lowering the turn table between a lowered position that prevents interference with the optical disk to be loaded or unloaded and a raised position at which the optical disk as loaded can be supported, an optical pickup recording and/or reproducing an information signal on the optical disk supported by the turn table, a pickup driving mechanism reciprocating the optical pickup between an inner peripheral side and an outer peripheral side of the optical disk supported by the turn table, a shared driving source mechanism generating a driving force at least for the turn table raising/lowering mechanism and the pickup driving mechanism, and a disk transport mechanism directly loading and unloading the optical disk under the driving force from the shared driving source mechanism. The shared driving source mechanism includes a shared motor serving as a rotation driving force source and a first gear group composed of a plurality of gears transmitting the rotation driving force of the shared motor by rotation in a plane parallel to a rotation plane of the turn table. The disk transport mechanism includes a transport roller provided so as to have its rotationally-moving shaft extending in parallel to a direction that a disk inlet/outlet for the optical disk extends, and a rotation plane converting gear converting the rotation driving force of the shared motor transmitted via the first gear group into the rotation driving force for the transport roller.

According to the optical disk apparatus of the present invention, the disk transport mechanism includes the transport roller and rotation plane converting gear converting the rotation driving force of the shared motor transmitted via the first gear group into the rotation driving force for the transport roller. Therefore, the driving mechanism for disk transportation is simplified, which can achieve size reduction of the drive as well as reduction in manufacturing costs.

These and other objects, features, aspects and advantages of the present invention will become more apparent from the following detailed description of the present invention when taken in conjunction with the accompanying drawings.

BEST MODE FOR CARRYING OUT THE INVENTION

Embodiment

<A. Basic Construction>

The basic construction of an optical disk apparatus 1 according to an embodiment of the present invention will be described using FIGS. 1 and 2.

Figure 1:
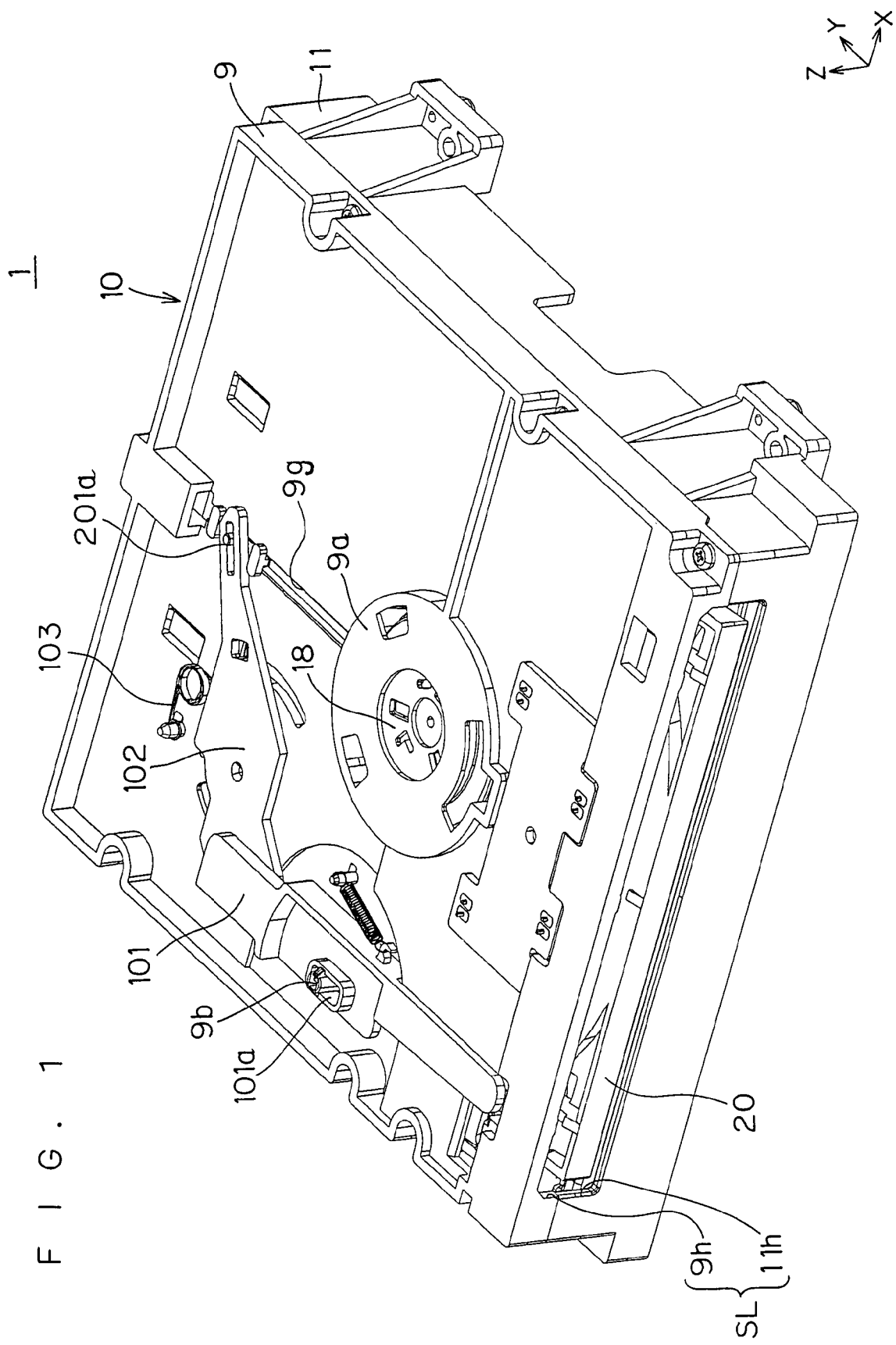
FIG. 1 is a perspective view showing an appearance of an optical disk apparatus according to an embodiment of the present invention.

FIG. 1 is a perspective view showing an external construction of the optical disk apparatus 1 when viewed slantingly from above. The following description will be made, for the sake of description, defining an axis parallel to the loading/unloading direction of an optical disk as a Y axis (the optical disk loading direction will be referred to as a (+)Y direction, and the optical disk unloading direction will be referred to as a (−)Y direction), an axis perpendicular to the Y axis on the main surface of the optical disk as an X axis (the right side in the (+) direction of the Y axis will be referred to as a (+)X direction, and the left side will be referred to as a (−)X direction), and an axis perpendicular to the main surface of the optical disk as an Z axis (the labeled surface side of the optical disk will be referred to as a (+)Z direction, and the recording surface side will be referred to as a (−)Z direction).

As shown in FIG. 1, in the optical disk apparatus 1, a main chassis 11 and a cover chassis 9 which may also be considered as the top cover of the main chassis 11 constitute a casing 10, and a disk inlet/outlet SL configured to allow an optical disk to go in/out therethrough is formed on one side surface of the casing.

The disk inlet/outlet SL is formed by combination of an opening 11h provided in the main chassis 11 and an opening 9h provided in the cover chassis 9, and an optical disk retaining plate called a flap 20 is provided on the side of the opening 9h.

The flap 20 has a slender rectangular shape in plan view and is inserted in the disk inlet/outlet SL in its widthwise direction, and configured to be movable such that the main surface of the flap 20 is inclined slantingly in the state where no optical disk is inserted, and the main surface of the flap 20 becomes substantially parallel to the main surface of the optical disk when the optical disk is inserted and when an optical disk is loaded/unloaded. FIG. 1 shows the state in which an optical disk is held inside the optical disk apparatus 1, and the flap 20 becomes substantially parallel to the main surface of the optical disk.

Further, a cylindrical damper holding part 9a is provided on the upper surface of the cover chassis 9 in a position slightly away from the center toward the disk inlet/outlet SL, an optical disk holding member called a damper 18 is held rotatably within the damper holding part 9a.

This damper 18 is supported in a position (in the (+)Z direction) above the vertical position of the moving path of an optical disk so as not to interfere with the optical disk when reciprocating in the Y-axis direction. Further, a magnet is held inside the damper 18, and attraction between the damper 18 and a turn table 52 (FIG. 2) which will be described later by means of the magnetic force of the magnet allows the optical disk to be compression bonded and held between the damper 18 and turn table 52.

Further, slender members called arms 101 and 102 are provided on the left (in the (−)X direction) end of the upper surface of the cover chassis 9. The arms 101 and 102 are configured to be engageable with each other at their one ends to operate in synchronization with each other.

The arm 101 has, substantially at its center, a slender opening 101a extending in the longitudinal direction of the arm 101, and a boss part 9b projecting perpendicularly from the upper surface of the cover chassis 9 is engaged with the opening 101a. The arm 101 is configured to be movable along the shape of the opening 101a and rotatable about the boss part 9b. The arms 101 and 102 are members for making a member called a disk stopper 201 (cf. FIG. 4 which will be mentioned later) provided on the rear surface of the cover chassis 9 movable.

The disk stopper 201 is provided such that its initial position is located near the turn table 52 so as to be in contact with the side of an optical disk when the optical disk is loaded into (held in) the optical disk apparatus 1, and is movable in the (+)Y direction by being guided along a groove part 9g formed along the center line of the Y axis at the farther side in the (+)Y direction with respect to the damper holding part 9a of the cover chassis 9.

Since the arm 102 has its distal end engaged with a boss part 201a of the disk stopper projecting from the groove part 9g, the arms 102 and 101 move in synchronization with the movement of the disk stopper 201 along the groove part 9g. When an optical disk is unloaded (discharged) from the inside of the optical disk apparatus 1, the disk stopper 201 is pressed back to its initial position by the elastic force of a spring 103 by which the arm 102 is spring-loaded.

Figure 2:
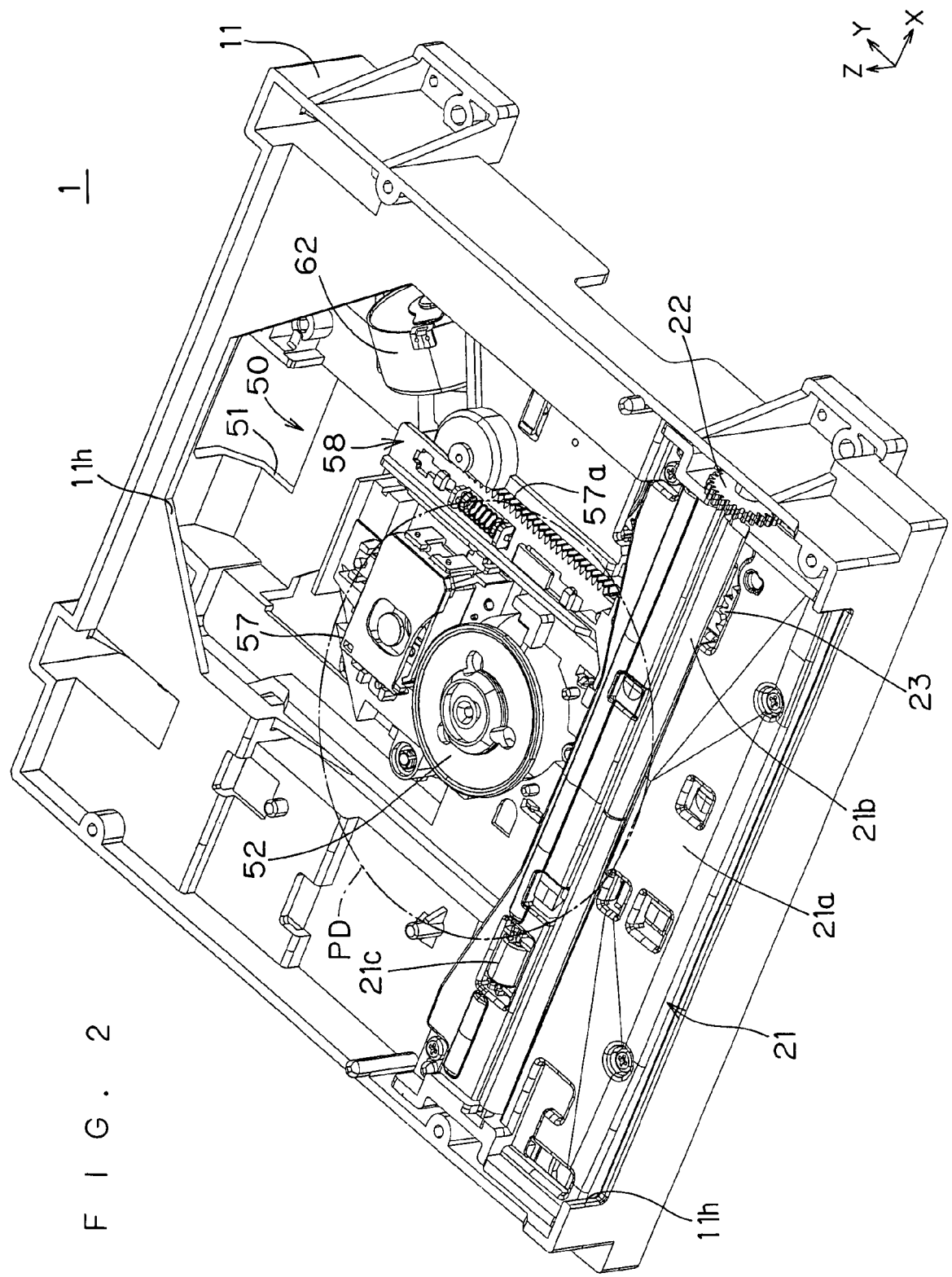
FIG. 2 is a perspective view showing the state in which a cover chassis is removed from the optical disk apparatus according to the embodiment of the present invention.

FIG. 2 shows the state in which the cover chassis 9 is removed from the optical disk apparatus 1 shown in FIG. 1. FIG. 2 dose not disclose all of the components, but mainly discloses components relevant to the driving mechanism. Further, in FIG. 2, an optical disk PD is shown imaginarily.

As shown in FIG. 2, a traverse chassis 51 supported to be swingable with respect to the main chassis 11 and a disk transport plate 21 provided along the opening 11h are provided in the main chassis 11.

Figure 3:
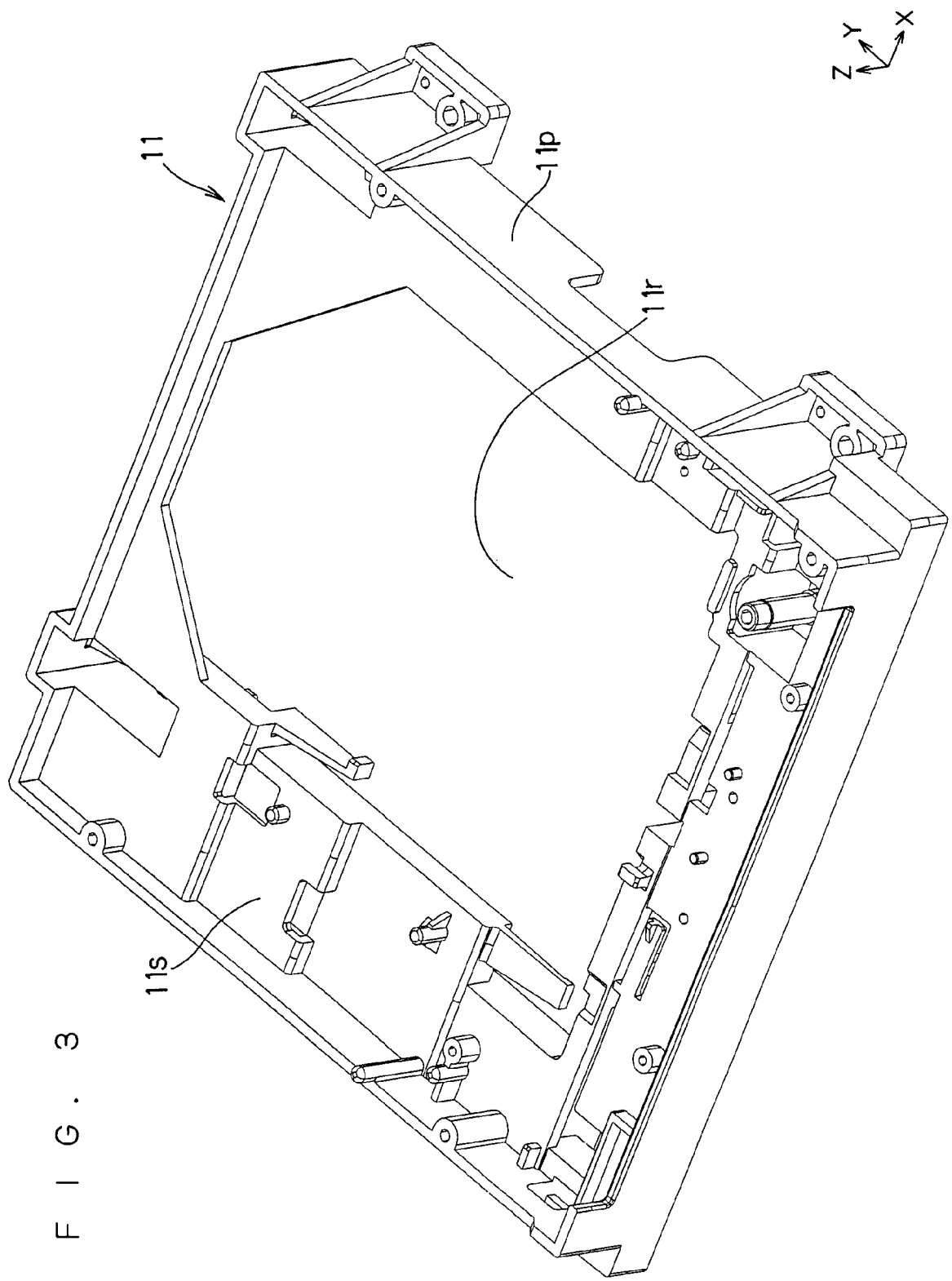
FIG. 3 is a perspective view showing the construction of a main chassis.
Figure 4:
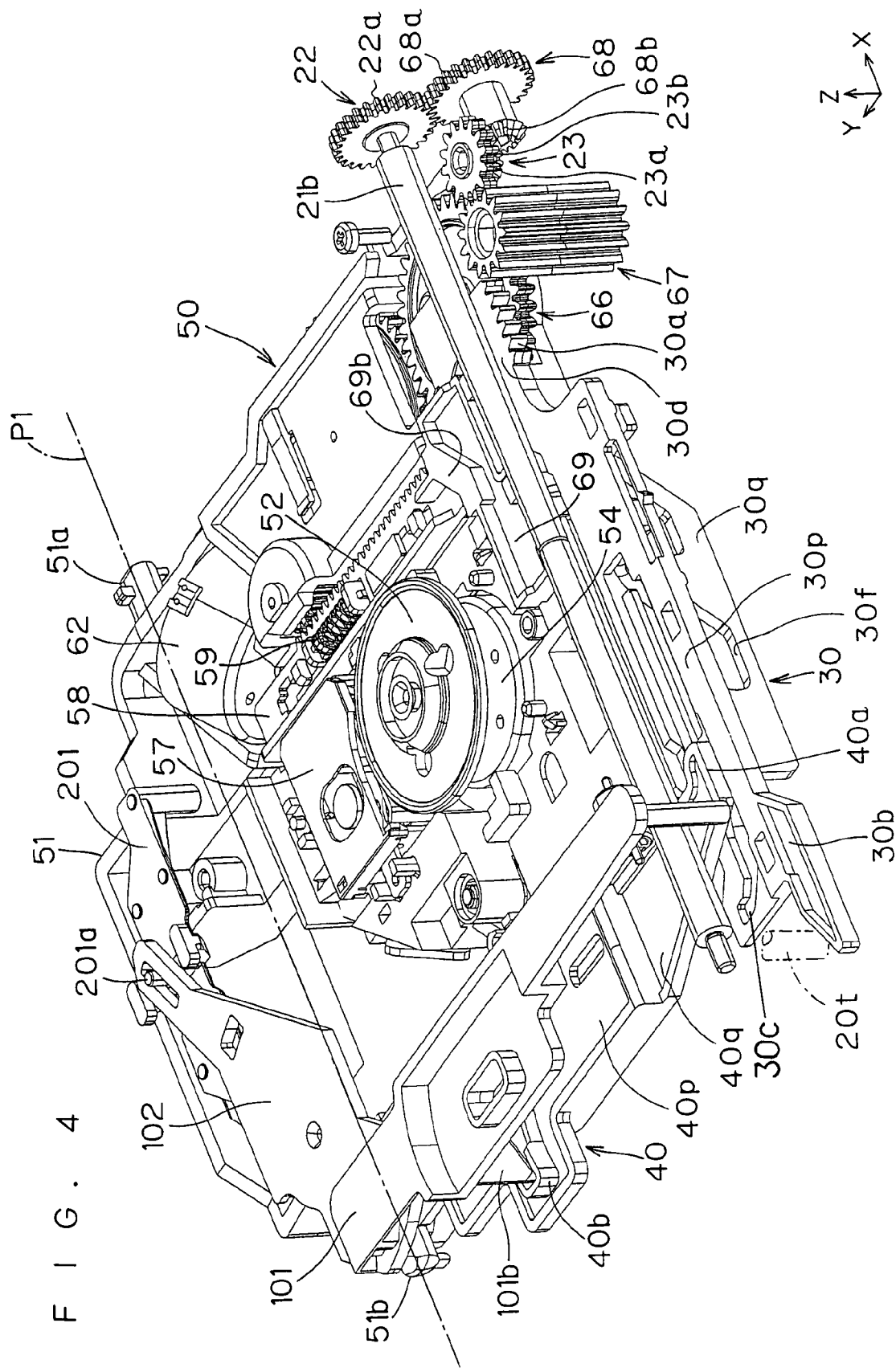
FIG. 4 is a perspective view showing the construction of a traverse unit.

Here, the construction of the main chassis 11 is shown in FIG. 3, and the construction of the traverse chassis 51 is shown in FIG. 4.

As shown in FIG. 3, the main chassis 11 is composed of a rectangular frame body 11p and a base part 11s provided inside the rectangular frame body 11p. The base part 11s is provided along the inner periphery of the rectangular frame body 11p, and is made up of a plurality of planar portions on which various members are to be mounted. And, a region surrounded by the base part 11s is an opening 11r in which the traverse chassis 51 is to be provided.

Further, the traverse chassis 51 has a size in plan view that fits within the rectangular frame body 11p, and, as shown in FIG. 4, is provided with rotationally-moving shafts 51a and 51b extending in parallel to the X direction at its ends on the side of the optical disk loading direction (in the (+)Y direction), and the rotations shafts 51*a* and 51*b* are supported to the main chassis 11 in a swingable manner so that the traverse chassis 51 is swingable within the main chassis 11 about the swing axis P1 formed by the rotationally-moving shafts 51*a* and 51*b*.

Since the traverse chassis 51 swings about the swing axis P1 as described above, the end of the traverse chassis 51 on the side of the optical disk unloading direction ((−)Y direction side) will be called a swing displacing side end.

<B. Construction of Respective Components>

Now referring back to the description of FIG. 2, the construction of the respective components will be described.

<B-1. Construction of Disk Transport Plate>

As shown in FIG. 2, the disk transport plate 21 provided in parallel to the opening 11*h* near the opening 11*h* includes a base part 21*a* having a slender rectangular shape in plan view, a transport roller 21*b* provided in the surface of the base part 21*a* so as to extend in the longitudinal direction of the base part 21*a*, and an auxiliary roller 21*c* provided in parallel to the transport roller 21*b* in the (+)Y direction side with respect to the transport roller 21*b*. The transport roller 21*b* and auxiliary roller 21*c* are provided such that almost half of their diameters are held within a groove and an opening provided in the base part 21*a*.

The transport roller 21*b* and auxiliary roller 21*c* are provided such that their rotary shafts extend in parallel to the X direction, and an optical disk mounted on these rollers is to be loaded into the optical disk apparatus 1 or unloaded from the optical disk apparatus 1 by rotation of these rollers.

The optical disk apparatus 1 is configured to allow the use of two types of optical disks having different diameters. The positions at which the transport roller 21*b* and auxiliary roller 21*c* are provided are defined such that an optical disk is placed above at least part of the transport roller 21*b* and auxiliary roller 21*c* when an optical disk having either diameter.

A gear 22 (roller gear) is engaged with one end of the rotary shaft of the transport roller 21*b*, and the gear 22 is a gear for giving the transport roller 21*b* the rotation driving force of a shared motor 62 transmitted via a gear group not shown. A gear 23 receiving the rotation driving force of the shared motor 62 transmitted via the gear group not shown is also attached rotatably to the rear surface of the base part 21*a*. The auxiliary roller 21*c* does not rotate on its own, but rotates in an auxiliary manner when transporting an optical disk.

<B-2. Construction of Traverse Chassis>

As shown in FIG. 2, the turn table 52 is provided near the distal end of the swing displacing side end of the traverse chassis 51. This turn table 52 is made of a material such as iron having the property of being attracted by magnetic force, and is configured to sandwich an optical disk with the damper 18 (FIG. 1). In this condition, it rotates integrally with the optical disk under the driving force of a spindle motor 54 (FIG. 5) serving as a rotation driving force mechanism which will be described later.

An optical pickup 57 movable in the Y-axis direction under the driving force of the shared motor 62 is provided in the traverse chassis 51. This optical pickup 57 is a component for recording a signal on an optical disk and/or reproducing a signal recorded on the optical disk. A slide rack 58 and a rack part 57*a* for converting the driving force of the shared motor 62 into a driving force for moving the optical pickup 57 in the Y-axis direction are provided in the (+)X direction of the optical pickup 57.

In the following description, a section composed of respective components including the traverse chassis 51, and the turn table 52 and optical pickup 57 incorporated into the traverse chassis 51 and the like will be called a traverse unit 50, and a section composed of other respective components, namely, respective components including the main chassis 11 and disk transport plate 21 incorporated in the main chassis 11 and the like will be called a loading unit.

<B-3. Construction of Traverse Unit>

Figure 5:
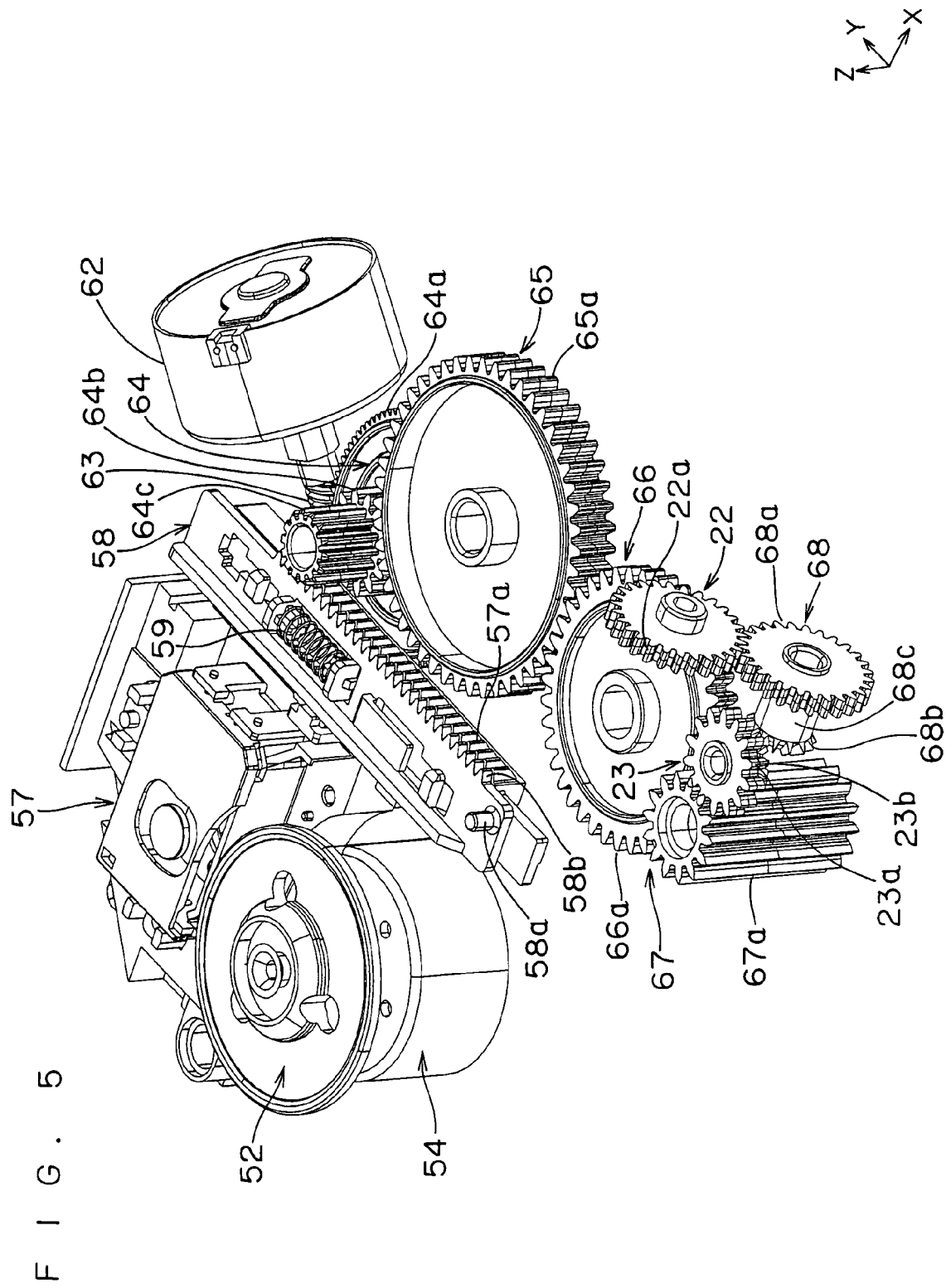
FIG. 5 is a perspective view showing a gear group constituting a power transmission mechanism.

Next, the construction of the traverse unit 50 will further be described using FIGS. 4 and 5.

FIG. 4 is a perspective view showing the construction of the traverse unit 50 and peripheral components, and for the sake of convenience, the main chassis 11, base part 21*a* of the disk transport plate 21 and the like are omitted. FIG. 5 is a perspective view showing the gear group associated with the disk transporting operation, turn table raising/lowering operation and pickup moving operation.

The traverse chassis 51 is a component forming the base of the traverse unit 50, and has a pair of rotationally-moving shafts 51*a* and 51*b* formed projectingly on the both side surfaces on its end of the swing axis P1.

The spindle motor 54 is provided below the turn table 42, and is fixed to the traverse chassis 51 in a position that its rotationally-moving shaft is directed toward an optical disk. This rotationally-moving shaft has its distal end press fit into a central hole of the turn table 52, so that the turn table 52 is supported rotatably on the optical disk side in the traverse chassis 51, and the turn table 52 is rotated by the rotation driving of the spindle motor 54.

The optical pickup 57 is provided between the turn table 52 and the end on the side of the swing axis P1. In the traverse chassis 51, a region corresponding to the movable range of the optical pickup 57 is a space region with which nothing interferes. The optical pickup 57 is guided and supported by a main shaft guide (not shown) provided in the Y-axis direction to be movable in the Y-axis direction.

The shared motor 62 is provided outside one side surface of the optical pickup 57. This shared motor 62 is used as a driving source of the disk transporting operation, turn table raising/lowering operation and pickup moving operation.

Further, a trigger plate 69 movable substantially in the X-axis direction is provided on the swing displacing side end of the traverse chassis 51. The trigger plate 69 has a slender rectangular shape in plan view, and is engaged with a cam slider 30 (slider member) on one side surface in its widthwise direction, and a cam groove 69*b* is formed on an intermediate portion in the longitudinal direction of the trigger plate 69 on the edge of the other side surface. The cam groove 69*b* is formed as a groove with which a boss part 58*a* of the slide rack 58 is engageable, and is bent midway in its extending direction. The slide rack 58 moves in the (−)Y direction, and the boss part 58*a* is inserted into the cam groove 69*b* to move inside the cam groove 69*b*, so that the boss part 58*a* is guided in the direction in accordance with the bent shape of the cam groove 69*b*.

The cam slider 30 is supported on the end of the main chassis 11 (not shown) in the optical disk unloading direction (the (−)Y direction) to be capable of reciprocating in the direction (the X-axis direction) perpendicular to the optical disk loading/unloading direction, and its overall configuration is made of a first piece 30*p* having a slender rectangular shape in plan view and a second piece 30*q* extending perpendicularly from its one side surface.

A gear part 30*d* provided with a rack gear 30*a* on its side surface extends from one end of the first piece 30*p* in its longitudinal direction. The gear part 30*d* has a slender rectangular shape in plan view, extends in the longitudinal direction of the first piece 30*p*, and has a width narrower than the first piece 30p, and the rack gear 30a is provided on part of the other side surface opposite to the side on which the second piece 30q is provided.

A small piece part 30b contributing to the opening/closing of the flap 20 is provided so as to extend out horizontally from the side surface of the other end of the first piece 30p in the longitudinal direction which is opposite to the side on which the second piece 30q is provided. The small piece part 30b is configured so as to extend also to the opposite side to the gear part 30d in the longitudinal direction of the first piece 30p.

Further, a groove part 30c extending through the main surface of the first piece 30p is provided on the other side end of the first piece 30p in its longitudinal direction.

The groove part 30c has a substantially L shape in plan view, and includes a substantially linear portion extending in the longitudinal direction of the first piece 30p and a portion extending diagonally toward the side surface on which the second piece 30q is provided. A slide plate 40 is configured to engage with this groove part 30c.

The slide plate 40 is supported to be capable of reciprocating substantially in the optical disk loading/unloading direction (the direction of the Y axis) on the end of the main chassis 11 (not shown) in the (−)X direction, and its overall configuration is made up of a first piece 40p having a slender rectangular shape in plan view and a second piece 40q extending in the longitudinal direction of the first piece 40p from one end of the first piece 40p in the longitudinal direction. A boss part 40t (FIG. 9) projecting perpendicularly from the rear surface of a distal end 40a of the second piece 40q engages with the groove part 30c. Accordingly, the slide plate 40 reciprocates substantially in the Y-axis direction in synchronization with the reciprocation of the cam slider 30 in the X-axis direction.

Further, the first piece 40p is provided with a groove part 40b extending through the main surface and extending substantially in the widthwise direction. The part where the groove part 40b is provided is part of the side surface of the first piece 40p extending out in the horizontal direction, and the groove part 40b is slightly arc contoured.

A projecting part 101b extending perpendicularly from the rear surface of the arm 101 described in FIG. 1 is configured to engage with the groove part 40b, and the slide plate 40 is configured to move in the Y-axis direction in synchronization with the reciprocation of the arm 101 substantially in the Y-axis direction.

Further, FIG. 4 shows the transport roller 21b, gear 22 and gear 23 provided on the disk transport plate 21 (FIG. 2), and also shows a fourth gear 68 supported rotatably on the inner wall of the side surface of the main chassis 11 (not shown) to be engaged with the gear 22 and gear 23 and a third gear 67 supported rotatably on the inner bottom of the main chassis 11 (not shown) to be engaged with the gear 23 and a second gear 66. The details of the respective gears will be described below using FIG. 5.

<B-4. Construction of Gear Group>

FIG. 5 shows the gear group associated with the disk transporting operation, turn table raising/lowering operation and pickup moving operation, the turn table 52 and optical pickup 57, while the construction of the traverse chassis 51 and other components little relevant to the gear group is omitted.

The shared motor 62 shown in FIG. 5 is fixed to the traverse chassis 51 by a screw not shown, and a worm gear 63 is press fit into its rotationally-moving shaft. The shared motor 62 and worm gear 63 are attached to the traverse chassis 51 with an inclination at an angle corresponding to the angle of advance of the worm gear 63 with respect to the rotation plane of a feed gear 64 which will be described later.

Further, the feed gear 64 is supported rotatably by the traverse chassis 51. The feed gear 64 includes a large gear part 64a which is a lower spur gear, a middle gear part 64b which is a spur gear provided thereon and a small gear part 64c which is a spur gear provided on the middle gear part 64b. The large gear part 64a meshes with the worm gear 63, and the small gear part 64c meshes with the rack part 57a of the optical pickup 57 and rack part 58b of the slide rack 58. The large gear part 64a is formed by a spur gear, but the large gear part 64a and worm gear 63 mesh with each other appropriately since the large gear part 64a is inclined by an angle corresponding to the angle of advance of the worm gear 63 as described above.

Here, rack teeth 58b having the same arrangement and same shape as rack teeth in the aforementioned rack part 57a are formed on the slide rack 58, and the small gear part 64c of the feed gear 64 is to be in mesh with the rack part 57a and rack teeth 58b of the slide rack 58.

Further, the length of the region where the rack teeth 58 are formed in the longitudinal direction (moving direction) of the slide rack 58 is greater than the length of the region where the rack teeth in the aforementioned rack part 57a are formed. This slide rack 58 is spring-biased with respect to the rack part 57a in the Y-axis direction by a spring 59 serving as bias means. Specifically, it is spring-biased by the loading force of this spring 59 such that the optical disk inner peripheral edge side of the rack-teeth forming region of the slide rack 58 is substantially aligned with the optical disk inner peripheral edge side of the rack-teeth forming region of the rack part 57a and such that the optical disk outer peripheral edge side of the rack-teeth forming region of the slide rack 58 slightly extends out from the optical disk outer peripheral edge side of the rack-teeth forming region of the rack part 57a. Accordingly, in the state of recording an information signal on an optical disk and/or reproducing, the small gear part 64c of the feed gear 64 is in mesh with both the rack part 57a and slide rack 58 when recording and/or reproducing an information signal on an optical disk.

The spring 59 also has the function of preventing backlash when the slide rack 58 and small gear part 64c of the feed gear 64 mesh with each other. Further, the boss part 58a to be engageable with the cam groove 69b of the trigger plate 69 (FIG. 4) is formed projectingly on the (optical disk inner peripheral side) end of the slide rack 58 on the side of the turn table 52.

Further, a first gear 65 and second gear 66 are supported rotatably on the bottom of the traverse chassis 51, and the third gear 67 and fourth gear 68 are supported rotatably on the main chassis 11.

The first gear 65 has a spur gear part 65a, and the second gear 66 has a spur gear part 66a. The spur gear part 65a of the first gear 65 is configured to mesh with the middle gear part 64b of the feed gear 64 and also with the spur gear part 66a of the second gear 66.

The third gear 67 has a spur gear part 67a having a vertically-long cylindrical shape, and the spur gear part 67a is configured to mesh with the spur gear part 66a of the second gear 66 and also with a spur gear part 23b of the gear 23 attached rotatably to the rear surface of the transport plate 21.

Here, the gear 23 has the spur gear part 23b and a bevel gear part 23a provided coaxially with the spur gear part 23b, and is attached to the transport plate 21 such that the flat part of the spur gear part 23b faces the rear surface of the transport plate 21.

The fourth gear 68 has a spur gear part 68a, a cylindrical part 68c provided on one side flat surface of the spur gear part 68a coaxially with the spur gear part 68a and a bevel gear part

68b provided on the distal end of the cylindrical part 68c, and the spur gear part 68a and bevel gear part 68b are coaxial. The fourth gear 68 is supported rotatably such that the flat part of the spur gear part 68a faces the inner wall of the side surface of the main chassis 11 (not shown), and the bevel gear part 68b of the gear 68 is configured to always mesh with the bevel gear part 23a of the gear 23.

Further, the spur gear part 68a of the fourth gear 68 is configured to always mesh with a spur gear part 22a of the gear 22 engaging with one end of the rotationally-moving shaft of the transport roller 21b provided on the transport plate 21.

The feed gear 64, first gear 65, second gear 66, third gear 67 and fourth gear 68 as described above constitute the power transmission mechanism receiving the rotation driving force of the shared motor 62 and transmitting the driving force to each mechanism, and this power transmission mechanism and shared motor 62 constitute a shared driving source mechanism for generating the driving force to be applied to each mechanism.

By appropriately combining these plurality of gears 64, 65, 66, 67 and 68, the rotation by the shared motor 62 is decelerated to a desired number of revolutions to be transmitted to the respective gears 64, 65, 66, 67 and 68.

Further, to the transport roller 21b of the transport roller 21, the rotation driving force of the shared motor 62 is transmitted via the gears 22 and 23 in addition to the gears 64, 65, 66, 67 and 68. The gear 64 to gear 67 constitute a first gear group for transmitting the rotation driving force of the shared motor 62 by rotation in a plane parallel to the rotation plane of the turn table 52 (horizontal plane in parallel to the main surface of an optical disk PD when the optical disk PD is held in the drive 1), while the fourth gear 68 and gear 22 transmit the rotation driving force of the shared motor 62 to the transport roller 21b by rotation in a vertical plane (a plane obtained by inclining the horizontal plane at 90 degrees), which may therefore be called a second gear group.

In this manner, the rotation driving force is given to the transport roller 21b of the transport plate 21 by the two gear groups rotating in different planes, and the gear 23 can be considered as a rotation plane converting gear for converting the rotation driving force given by the shared motor 62 into the rotation driving force with the angle of rotation plane turned at 90 degrees. Providing the gear 23 can achieve the disk transport operation with the same motor as the turn table raising/lowering operation and pickup moving operation. The fourth gear 68 can be called a relay gear for transmitting the rotation driving force of the gear 23 to the gear 22.

Further, as described above, the gear rotation plane conversion is carried out by the bevel gear part 23a of the gear 23 and bevel gear part 68b of the fourth gear 68. The rotation driving force by a bevel gear can be transmitted at a transmission efficiency at the same level as a spur gear. That is, the rotation driving force of the first gear group can be transmitted to the transport roller 21b efficiently. Further, the gear 23 is arranged to prevent the fourth gear 68 from being slipped out of the boss by which it is rotatably supported, and the fourth gear 68 is arranged to prevent the gear 23 from being slipped out of the boss by which it is rotatably supported. Therefore, addition of components for preventing these gears from being slipped out is not required.

Here, since the gear 23 always meshes with the third gear 67 and fourth gear 68, the transport roller 21b always rotates in either rotation direction as long as the shared motor 62 rotates, but no problem arises because an optical disk does not interfere with the transport roller 21b when recording and/or reproducing a signal on the optical disk.

The gears 22 and 23 are attached to the transport plate 21, and both the gears 22 and 23 can be removed from the gear groups by removing the transport plate 21 from the main chassis 11, which facilitates maintenance, however, the transport plate 21 is not removed in normal use of the optical disk apparatus 1.

<B-5. Construction of Flap>

Next, the construction of the flap 20 and how it is attached will be described using FIGS. 6 and 7.

Figure 6:
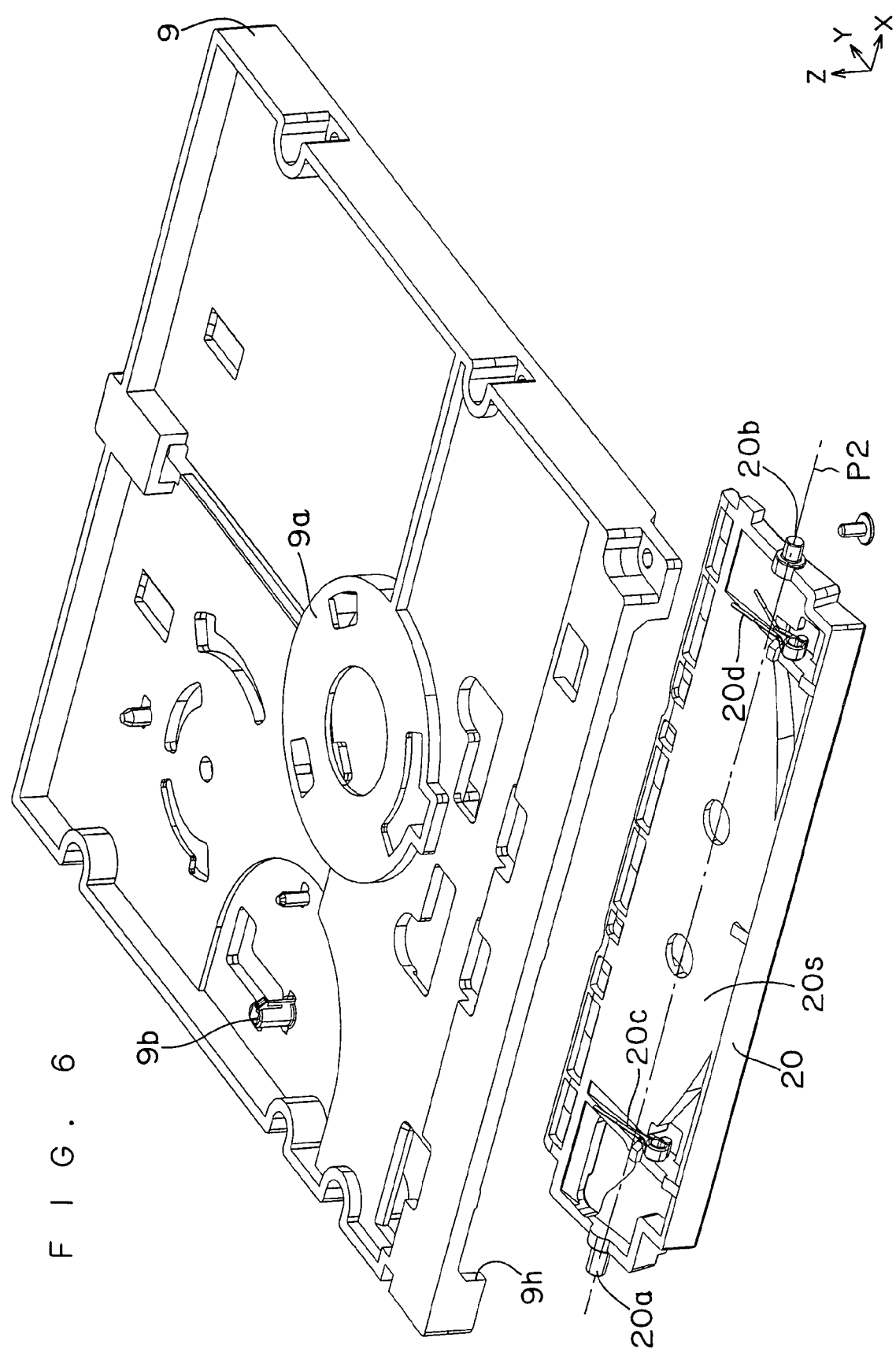
FIG. 6 is a perspective view showing the construction of a flap.
Figure 7:
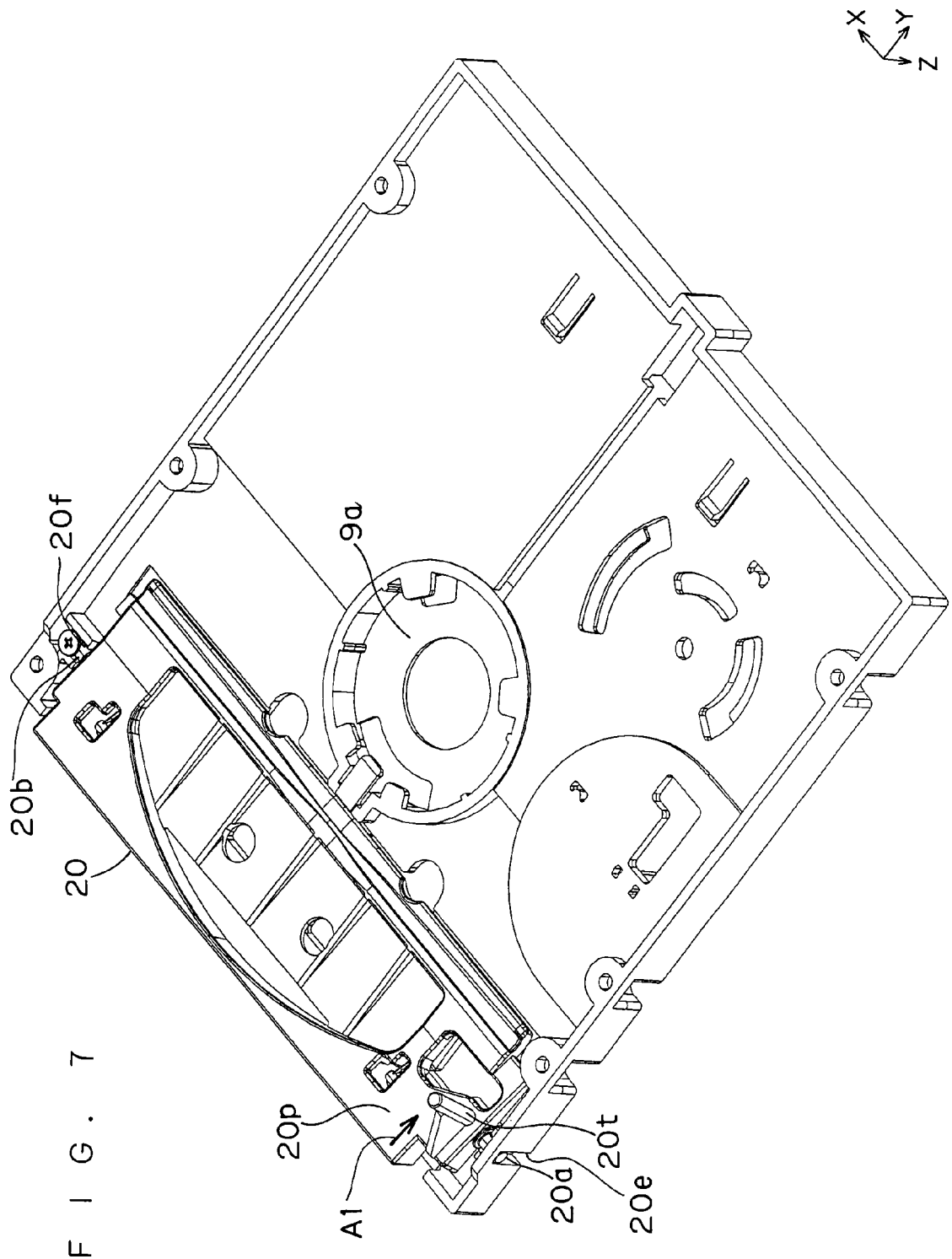
FIG. 7 is a perspective view showing the state in which the flap is attached.

FIG. 6 is a perspective view showing the state in which the flap 20 is removed from the cover chassis 9 as viewed from the external surface side, and FIG. 7 is a perspective view showing the state in which the flap 20 is attached to the cover chassis 9 as viewed from the inner surface side of the cover chassis 9.

As shown in FIG. 6, boss parts 20a and 20b are provided on the side surfaces of two edges in the longitudinal direction of the flap 20 having a slender rectangular shape to project perpendicularly from the side surfaces, respectively.

As shown in FIG. 7, the boss parts 20a and 20b are rotatably supported at engaging parts 20e and 20f provided inside the cover chassis 9, and the boss parts 20a and 20b constitute a swing axis P2.

Springs 20c and 20d are provided on a rear surface 20s of the flap 20 facing the inner surface of the cover chassis 9 in a position near the two edges in the longitudinal direction, respectively.

The springs 20c and 20d are loading means for making the flap 20 swingable about the swing axis P2. When an optical disk is not held in the optical disk apparatus 1, the end in the optical disk loading direction ((+)Y direction) is in the position most distant from the inner surface of the cover chassis 9, and the end in the optical disk unloading direction ((−)Y direction) is in the closest position to the inner surface of the cover chassis 9. This will be called an initial position of the flap 20.

Inserting an optical disk through the disk inlet/outlet SL (FIG. 1) when the flap 20 is in the initial position, the edge of the optical disk is sandwiched between the flap 20 and transport roller 21b of the transport plate 21, so that the optical disk is forced in the loading direction while the transport roller 21b holds the optical disk securely.

As the loading of the optical disk progresses, the rear surface 20s of the flap 20 becomes substantially parallel to the inner surface of the cover chassis 9. This will be called an operating position of the flap 20. Displacement of the flap 20 to the operating position allows the flap 20 to be fixed at a position that does not interfere with the rotation of the optical disk.

As the flap 20 approaches the operating position, the optical disk is no longer held by the flap 20, but at this stage, the optical disk is positioned on the transport roller 21b across a wide area, to be therefore transported in the loading direction without being deviated from above the transport roller 21b or slipped down from the disk inlet/outlet SL.

A member for displacing the flap 20 from the initial position to the operating position in this manner is a push-up rod 20t provided on a surface 20p of the flap 20 shown in FIG. 7. The push-up rod 20t is provided on the edge of the two edges of the flap 20 in the longitudinal direction on which the boss part 20a is provided, and is configured to be a rod-like member projecting perpendicularly from the surface 20p. Applying a force to the push-up rod 20t in the direction indicated by an arrow A1 when the flap 20 is in the initial position, the flap 20 swings to be displaced to the operating position. FIG. 7 shows the state in which the flap 20 is in the operating position.

The member applying a force to the push-up rod 20*t* in the direction ((+)Y direction) indicated by the arrow A1 is the small piece part 30*b* of the cam slider 30 described using FIG. 4.

That is, when covering the main chassis 11 with the cover chassis 9 with the flap 20 incorporated therein, the push-up rod 20*t* is positioned near the distal end of the small piece part 30*b* of the cam slider 30. At this time, the push-up rod 20*t* and small piece part 30*b* are not in contact, and the flap 20 is in the initial position.

The cam slider 30 slides in the (−)X direction with the loading movement of the optical disk, and distal end of the small piece part 30*b* starts to be in contact with the push-up rod 20*t* with the sliding movement of the cam slider 30. Here, the edge of the small piece part 30*b* opposed to the push-up rod 20*t* is configured to have an inclination, and gradually forces the push-up rod 20*t* in the (+)Y direction as the cam slider 30 slides in the (−)X direction.

Then, when the sliding of the cam slider in the (−)X direction reaches the end point, the cam slider 30 does not slide in either direction, and the push-up rod 20*t* is kept pressed by the small piece part 30*b*, allowing the flap 20 to be fixed in the operating position.

In this manner, the flap 20 is swung in synchronization with the movement of the cam slider 30, so that the flap 20 can be swung with the loading/unloading of the optical disk.

Further, the flap 20 is swung by pushing up the push-up rod 20*t*, so that the flap 20 can be swung with a simple construction, which minimizes the likelihood of occurrence of troubles and reduces the manufacturing costs.

<C. Device Operation>

Next, the disk transporting operation, turn table raising/lowering operation and pickup moving operation in the optical disk apparatus 1 will be described using FIGS. 8 to 10 with reference to FIGS. 1 through 6.

<C-1. Operation with Optical Disk not Loaded>

Figure 8:
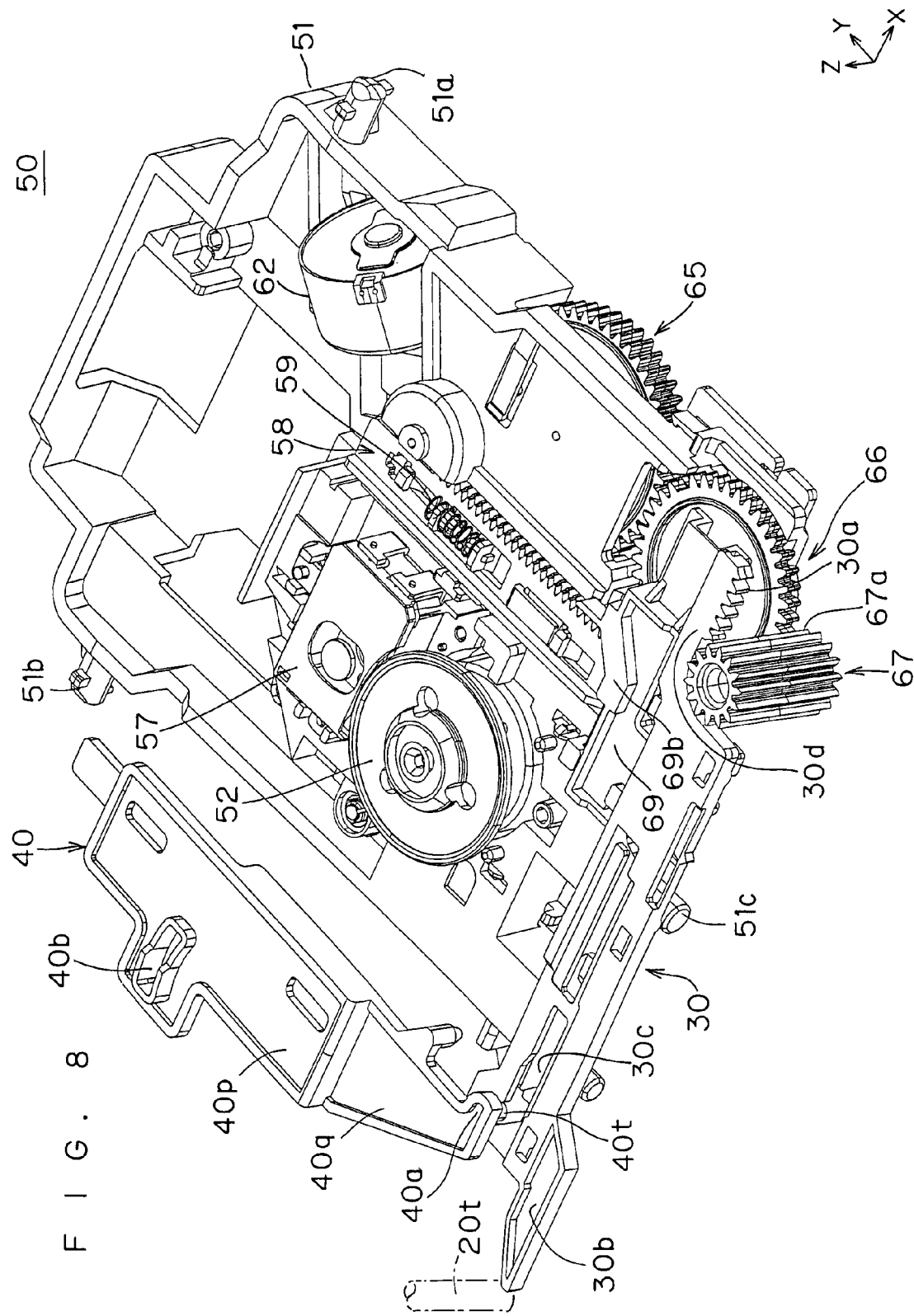
FIG. 8 is a perspective view showing the state of a traverse unit at the stage where an optical disk is not loaded.

FIG. 8 is a perspective view showing the state in which an optical disk is not loaded in the optical disk apparatus 1, and the traverse chassis 51 provided with the turn table 52, optical pickup 57 and the like is swung about the rotationally-moving shafts 51*a* and 51*b* such that the swing displacing side end is inclined relative to the main chassis 11 in a direction that the turn table 52 moves away from the damper 18 (FIG. 1) for preventing the interference between the optical disk to be thereafter drawn into the inside of the drive 1 and turn table 52.

At this time, the turn table 52 is in the lowest position, and the optical pickup 57 is in the closest position to the turn table 52, and the boss part 58*a* (FIG. 5) provided on one end of the slide rack 58 near the turn table 52 is inserted to the deepest position of the cam groove 69*b* of the trigger plate 69, and the spring 59 is in the highest pressurized position.

Further, the spur gear part 67*a* of the third gear 67 rotates under the rotation driving force of the shared motor 62 from the spur gear part 66*a* of the second gear 66, and its rotation driving force is transmitted to the bevel gear part 68*b* of the fourth gear 68 via the gear 23 (FIG. 4) of the disk transport plate 21, and the rotation driving force of the bevel gear part 68*b* is transmitted to the gear 22 of the disk transport plate 21 via the spur gear part 68*a*, to serve as the rotation driving force for the transport roller 21*b* (FIG. 4) of the disk transport plate 21. At this time, the transport roller 21*b* is rotated in the direction that the optical disk is drawn into the optical disk apparatus 1.

Further, at this time, the cam slider 30 is positioned at the end point in the (+)X direction, and the rack gear 30*a* of the gear part 30*d* of the cam slider 30 is not in mesh with the third gear 67, so that the rotation driving force of the third gear 67 does not contribute to the sliding movement of the cam slider 30. In this state, the rotation driving force of the third gear 67 contributes only to the rotation of the transport roller 21*b* (FIG. 4) of the disk transport plate 21.

Further, since the cam slider 30 is positioned at the end point in the (+)X direction, the boss part 40*t* projecting perpendicularly from the rear surface of the distal end 40*a* of the second piece 40*q* of the slide plate 40 is positioned at the extreme end in the (−)X direction of the groove part 30*c* of the cam slider 30.

When an optical disk is inserted through the disk inlet/outlet SL (FIG. 1) with the transport roller 21*b* rotated in the direction that the optical disk is drawn into the optical disk apparatus 1 to bring the flap 20 into the initial position, the edge of the optical disk is sandwiched between the flap 20 and transport roller 21*b* of the transport plate 21, so that the optical disk is forced in the loading direction while the transport roller 21*b* holds the optical disk securely.

<C-2. Operation after Optical Disk Loading>

Figure 9:
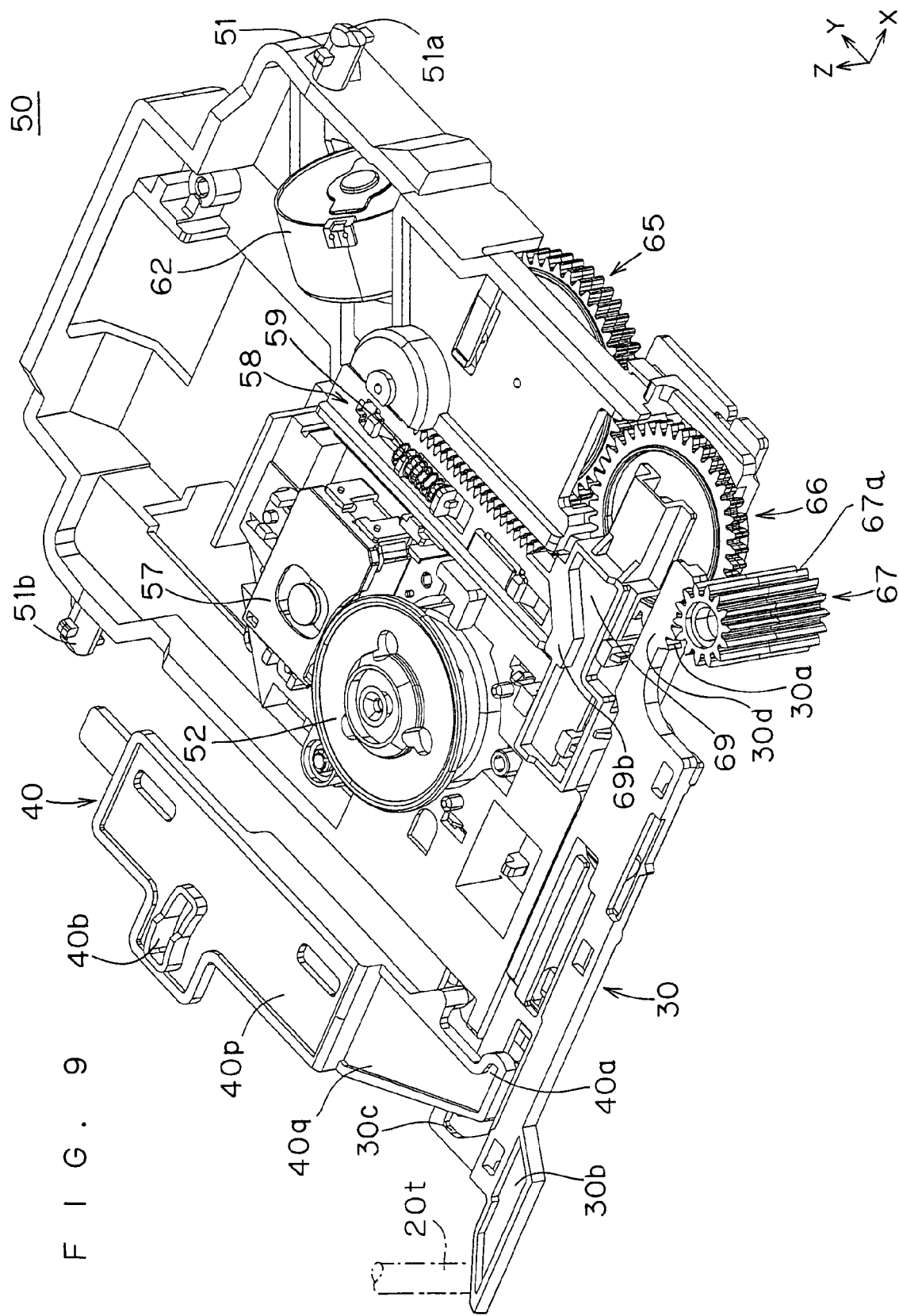
FIG. 9 is a perspective view showing the state of the traverse unit during loading of the optical disk.

FIG. 9 shows an intermediate state during which, after the optical disk is loaded into the drive 1 to reach the position directly above the turn table 52, the swing displacing side end of the traverse chassis 51 is swung about the rotationally-moving shafts 51*a* and 51*b* in the direction that the turn table 52 comes closer to the damper 18 (FIG. 1), so that the turn table 52 is raised.

This operation will be described further. When the optical disk moves to the position directly above the turn table 52, the disk stopper 201 (FIG. 4) provided on the rear surface of the cover chassis 9 is guided along the groove part 9*g* (FIG. 1) to move in the (+)Y direction. At this time, the arm 101 slides in the (−)Y direction in synchronization with the arm 102, and the slide plate 40 also slides in the (−)Y direction at the same time with the sliding of the arm 101 in the (−)Y direction since the projecting part 101*b* extending perpendicularly from the rear surface of the arm 101 engages with the groove part 40*b* of the slide plate 40, as described using FIG. 4.

When the slide plate 40 slides in the (−)Y direction, the boss part 40*t* of the slide plate 40 having been positioned at the extreme edge of the groove part 30*c* of the cam slider 30 in the (−)X direction presses the inclined surface of the bend of the groove part 30*c* having substantially an L-shape in plan view to move back the cam slider 30 from the state shown in FIG. 8 in the (−)X direction.

The travel distance of the moving back is set at a small but sufficient distance for the rack gear 30*a* of the gear part 30*d* of the cam slider 30 to mesh with the third gear 67, and the rotation driving force of the third gear 67 is converted into a linear driving force by the rack gear 30*a* to slide the cam slider in the (−)X direction.

Here, the cam slider 30, as described using FIG. 4, has the second piece 30*q* extending perpendicularly from one side surface of the first piece 30*p*, and the second piece 30*q* is provided with a cam groove 30*f* having a Z-shape in plan view with which a to-be-driven boss part 51*c* (FIG. 8) formed projectingly on the edge of the swing displacing side end of the traverse chassis 51, and the aforementioned to-be-driven boss part 51*c* is guided along the aforementioned cam groove 30*f* to be pulled up in the (+)Z direction with the sliding of the cam slider 30 in the (−)X direction, so that the swing displacing side end of the traverse chassis 51 is swung in the direction that the turn table 52 comes closer to the damper 18 (FIG. 1). This operation will be called a raising operation of the turn table 52.

In the optical disk unloading, the cam slider 30 slides in the opposite direction as described above, so that the traverse chassis 51 is swung in the direction that the turn table 52 moves away from the damper 18. This operation will be called a lowering operation of the turn table 52.

As described above, the to-be-driven boss part and cam slider 30 are main components of the turn table raising/lowering mechanism for raising/lowering the turn table.

The length in which the rack gear 30a of the cam slider 30 is provided is set at such a length that the turn table 52 with an optical disk mounted thereon moves to a position in the (+)Z direction (a predetermined vertical position) where information recording and/or reading operation by the optical pickup 57 can be made, and the sliding of the cam slider 30 in the X direction stops after the rack gear 30a is disengaged from mesh with the third gear 67.

When the turn table 52 is raised to the predetermined vertical position, the optical disk is held between the turn table 52 and damper 18 by the attractive force produced by the magnetic force of the damper 18.

<C-3. Optical Pickup Moving Operation>

Figure 10:
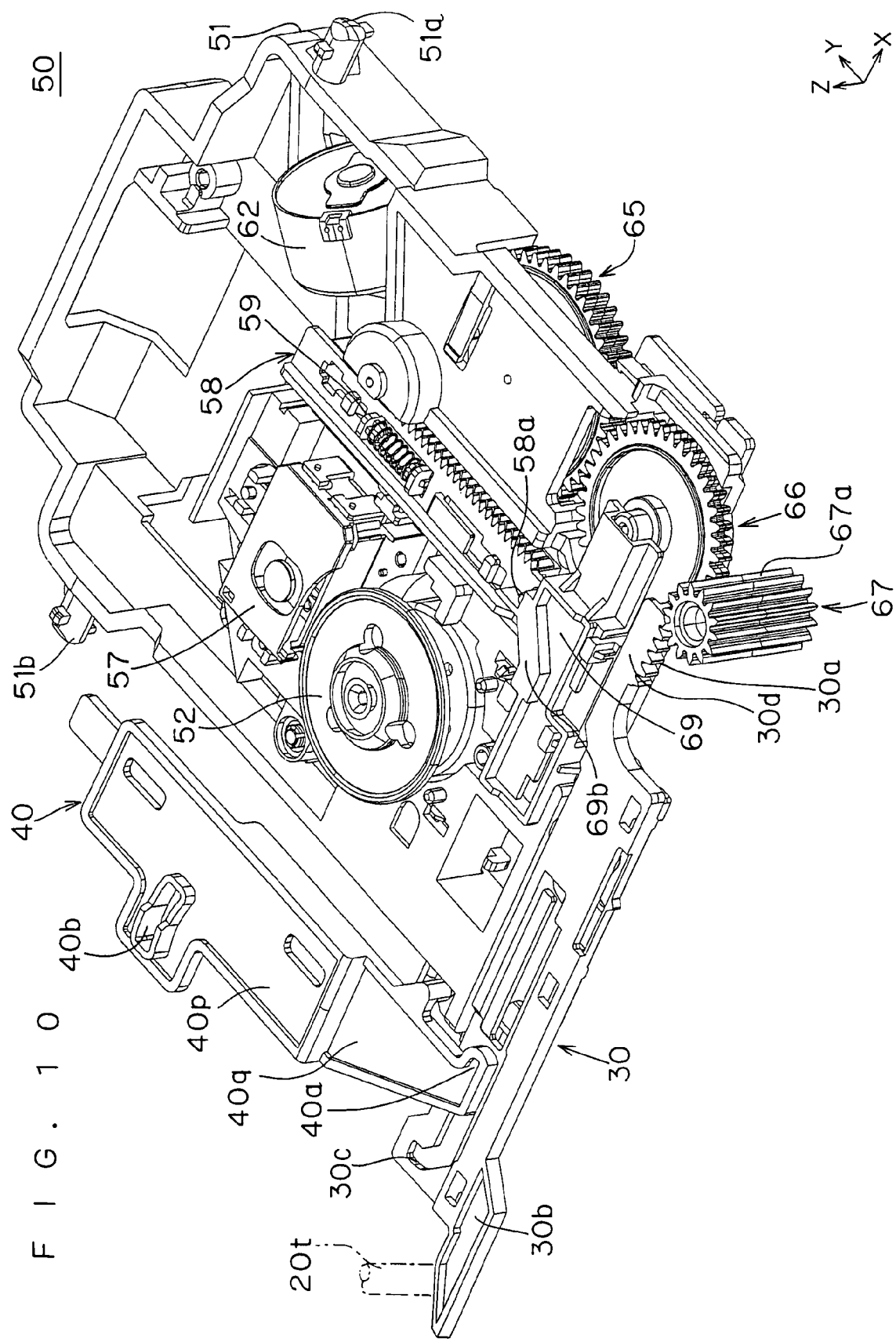
FIG. 10 is a perspective view showing the state of the traverse unit at the stage where the optical disk is loaded.

FIG. 10 is a perspective view showing the state in which an optical disk is held between the turn table 52 and damper 18, where information recording and/or reading operation can be made.

In this state, the boss part 58a provided on one end of the slide rack 58 near the turn table 52 does not engage with the cam groove 69b of the trigger plate 69, and the rack part 57a of the optical pickup 57 and small gear part 64c of the feed gear 64 are brought to mesh with each other, so that the slide rack 58 and rack part 57a of the optical pickup 57 become slidable independently in the Y direction away from the trigger plate 69.

That is, when the worm gear 63 is rotated by the rotation driving force of the shared motor 62, the large gear part 64a of the feed gear 64 is rotated by the worm gear 63 in a direction in accordance with the rotation of the shared motor 62. By the mesh between the small gear part 64c (FIG. 5) of the feed gear 64 and rack part 57a (FIG. 5) of the optical pickup 57, the rotation of the feed gear 64 is transmitted to the optical pickup 57 as the driving force for moving the optical pickup 57 in the Y-axis direction. In this manner, the optical pickup 57 is capable of reciprocating in a predetermined radial direction (in the direction of Y axis) in accordance with the direction of rotation of the shared motor 62. It is needless to say that, at this time, the slide rack 58 also reciprocates along the Y axis in the same direction as the optical pickup 57 by the mesh between the small gear part 64c of the feed gear 64 and the slide rack 58.

In recording and/or reproducing an information signal, the optical disk rotates under the rotation driving force of the spindle motor 54 (FIG. 5), and the optical pickup 57 reciprocates in the Y-axis direction, so that the information signal is recorded on and/or reproduced from a predetermined data area on the optical disk.

In the reproducing operation, for example, the optical pickup 57 moves to a predetermined position where a desired information signal to be read is recorded on the optical disk, to thereby reproduce the information signal. The reciprocation of the optical pickup 57 in the Y-axis direction is achieved by a pickup driving mechanism including the rack part 57a.

An operation in which the turn table 52 is fully raised to cause the rack part 57a of the optical pickup 57 and small gear part 64c of the feed gear 64 to mesh with each other and a reverse operation thereof will be called a driving-force transmission-path switching operation.

By the driving-force transmission-path switching operation, the transmission path of the driving force produced by the shared driving source mechanism can be switched from a path leading to the pickup driving mechanism into a path leading to the turn table raising/lowering mechanism, or vice versa, and a mechanism for carrying out such switching operation will be called a driving-force transmission-path switching mechanism.

The aforementioned reverse operation is an operation as described below.

That is, the direction of rotation of the shared motor 62 is reversed relative to the optical disk loading, and the boss part 58a provided on one end of the slide rack 58 near the turn table 52 reaches the deepest position in the cam groove 69b of the trigger plate 69, to cause the mesh between the rack part 57a of the optical pickup 57 and the small gear part 64c of the feed gear 64 to be disengaged, and cause the slide rack 58 and rack part 57a of the optical pickup 57 to be locked to the trigger plate 69, so that the sliding in the Y direction cannot be made.

In this state, the rack gear 30a of the gear part 30d of the cam slider 30 meshes with the third gear 67 to slide the cam slider 30 in the (+)X direction under the rotation driving force of the shared motor 62 (reverse rotation relative to the optical disk loading).

By the sliding of the cam slider 30 in the (+)X direction, the to-be-driven boss part 51c (FIG. 8) formed projectingly on the edge of the swing displacing side end of the traverse chassis 51 is guided along the cam groove 30f (FIG. 4) provided on the second piece 30q of the cam slider 30 in the (−)Z direction, so that the traverse chassis 51 is swung such that the swing displacing side end of the traverse chassis 51 moves the turn table 52 away from the damper 18, to thereby lower the turn table 52. At this time, the engagement between the small piece part 30b of the cam slider 30 and the rod 20t is released, and therefore, the push-up rod 20t returns to its initial position, causing the flap 20 to also return to its initial position.

Then, when the turn table 52 is fully lowered, the optical disk comes into contact with the transport roller 21b (FIG. 4) of the transport plate 21 from above. The transport roller 21b rotates in the direction to push the optical disk out of the optical disk apparatus 1 under the rotation driving force of the shared motor 62 rotating in the reverse direction relative to the optical disk loading. The optical disk in contact with the transport roller 21b (FIG. 4) from above is sandwiched between the flap 20 tending to return to its initial position by the load applied by the springs 20c and 20d (FIG. 6) and transport roller 21b, and the transport roller 21b forces the optical disk in the unloading direction while holding the optical disk securely.

Figure 11:
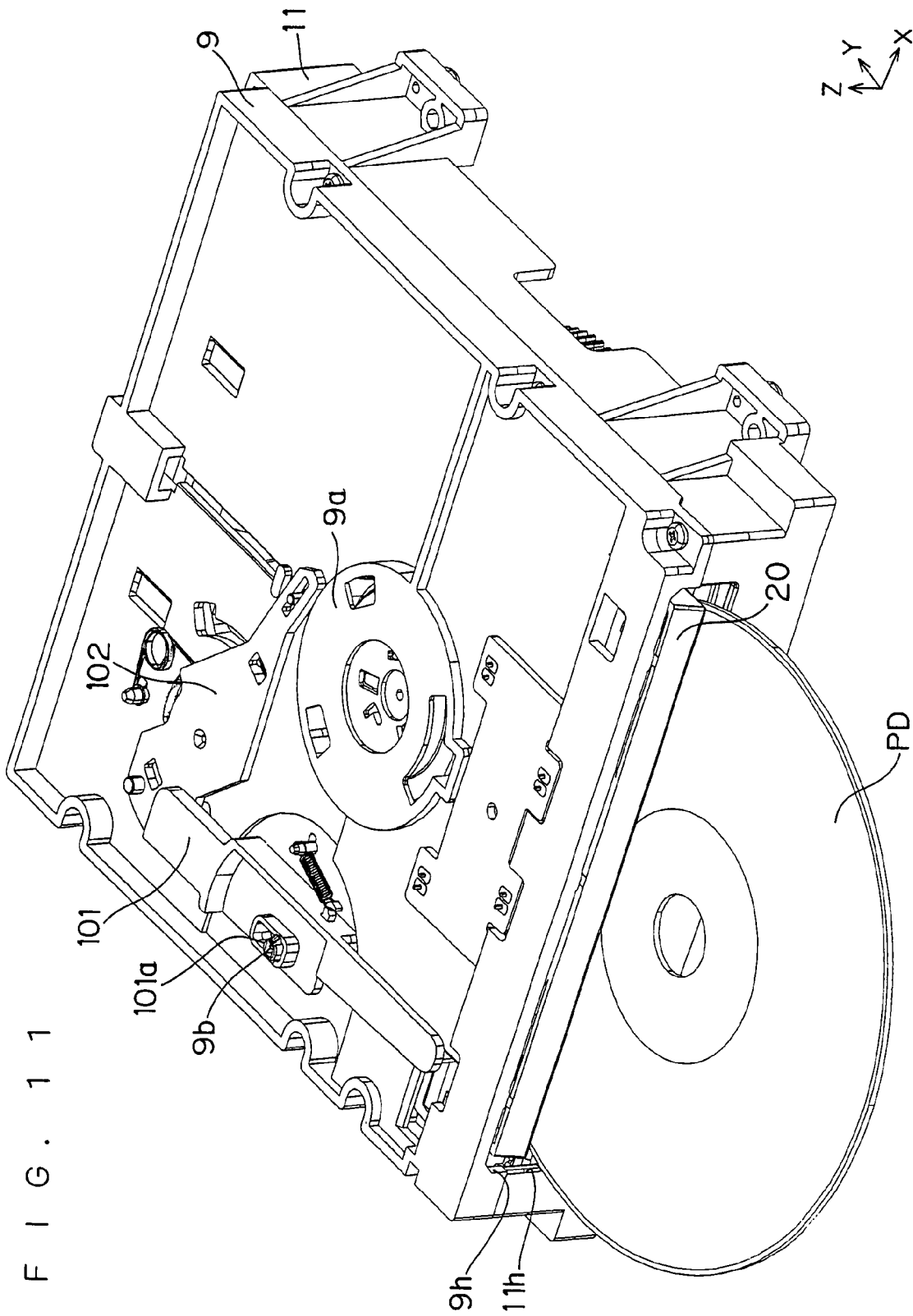
FIG. 11 is an external perspective view showing the state in which the optical disk is unloaded from the optical disk apparatus according to the embodiment of the present invention.

FIG. 11 shows the state in which the optical disk PD is almost fully unloaded from the optical disk apparatus 1. The edge of the optical disk PD positioned inside the optical disk apparatus 1 is sandwiched between the flap 20 and transport roller 21b not to be slipped down.

<D. Distinctive Effects>

In the optical disk apparatus 1 according to the embodiment of the present invention, as described above, the transport roller 21b of the transport plate 21 is given the rotation driving force via the two gear groups rotating in different planes, and the rotation driving force given by the shared motor 62 is converted by the rotation plane converting gear 23 into the rotation driving force with the angle of rotation plane turned at 90 degrees, to thereby rotate the transport roller 21c for disk transportation, so that an optical disk apparatus of slot-in type of directly loading/unloading an optical disk into/from the optical disk apparatus 1. Further, a dedicated driving mechanism for disk transportation is only composed of the fourth gear 68 attached to the main chassis 11, and the transport roller 21b and gears 22 and 23 belonging to the transport plate 21, making the driving mechanism simple, which can achieve size reduction of the drive and reduction in manufacturing costs with less likelihood of occurrence of structural troubles.

While the invention has been shown and described in detail, the foregoing description is in all aspects illustrative and not restrictive. It is therefore understood that numerous modifications and variations can be devised without departing from the scope of the invention.

The invention claimed is:

1. An optical disk apparatus into/from which an optical disk is freely loaded/unloaded for recording and/or reproducing an information signal on said optical disk, comprising:
   a turn table supporting rotatably said optical disk as loaded;
   a rotation driving source mechanism rotationally driving said turn table;
   a turn table raising/lowering mechanism raising/lowering said turn table between a lowered position that prevents interference with said optical disk to be loaded or unloaded and a raised position at which said optical disk as loaded can be supported;
   an optical pickup recording and/or reproducing an information signal on said optical disk supported by said turn table;
   a pickup driving mechanism reciprocating said optical pickup between an inner peripheral side and an outer peripheral side of said optical disk supported by said turn table;
   a shared driving source mechanism generating a driving force at least for said turn table raising/lowering mechanism and said pickup driving mechanism;
   a disk transport mechanism directly loading and unloading said optical disk under the driving force from said shared driving source mechanism;
   a main chassis serving as a base of said optical disk apparatus;
   a traverse chassis having a swing displacing side end and a swing axis side end attached to said main chassis in a swingable manner such that said swing displacing side end is freely movable close to or away from said main chassis, said turn table moving to said raised position by movement of said swing displacing side end close to said main chassis, while said turn table moving to said lowered position by movement of said swing displacing side end away from said main chassis; and
   a disk retaining plate having a slender rectangular shape in plan view and being inserted into a disk inlet/outlet in its widthwise direction, wherein
   said shared driving source mechanism includes:
      a shared motor serving as a rotation driving force source; and
      a first gear group composed of a plurality of gears transmitting the rotation driving force of said shared motor by rotation in a plane parallel to a rotation plane of said turn table,
   said disk transport mechanism includes:
      a transport roller provided so as to have its rotationally-moving shaft extending in parallel to a direction that said disk inlet/outlet for said optical disk extends;
      a rotation plane converting gear converting the rotation driving force of said shared motor transmitted via said first gear group into the rotation driving force for said transport roller; and
      a second gear group composed of a roller gear engaged with one end of said rotationally-moving shaft of said transport roller and a relay gear meshing with said rotation plane converting gear for transmitting the rotation driving force of said rotation plane converting gear to said roller gear,
   said rotation plane converting gear has a spur gear part and a bevel gear part provided coaxially with said spur gear part,
   said relay gear has a spur gear part, a cylindrical part provided on one side flat part of the spur gear part coaxially with said spur gear part and a bevel gear part provided on an distal end of the cylindrical part,
   said bevel gear part of said rotation plane converting gear meshes with said bevel gear part of said relay gear,
   said turn table raising/lowering mechanism includes a driven boss provided on said swing displacing side end of said traverse chassis and a slider member having a cam groove with which said driven boss is engageable, said slider member being provided on said main chassis to freely reciprocate in a predetermined direction, reciprocation of said slider member in said predetermined direction causing said driven boss to be guided along said cam groove, so that said turn table is raised/lowered, and
   said disk retaining plate is configured to be swingable about a swing shaft provided in parallel to its longitudinal direction, said slider member being engaged with part of said disk retaining plate, thereby swinging said disk retaining plate.

2. The optical disk apparatus according to claim 1, wherein said disk retaining plate has a rod member extending perpendicularly from a main surface of said disk retaining plate facing said optical disk to reach substantially the same level as a plane on which said slider member is provided, and
   said slider member moves in said predetermined direction to be engaged with said rod member to load said rod member in a direction perpendicular to said predetermined direction, so that said disk retaining plate swings.

* * * * *